Figure 1:
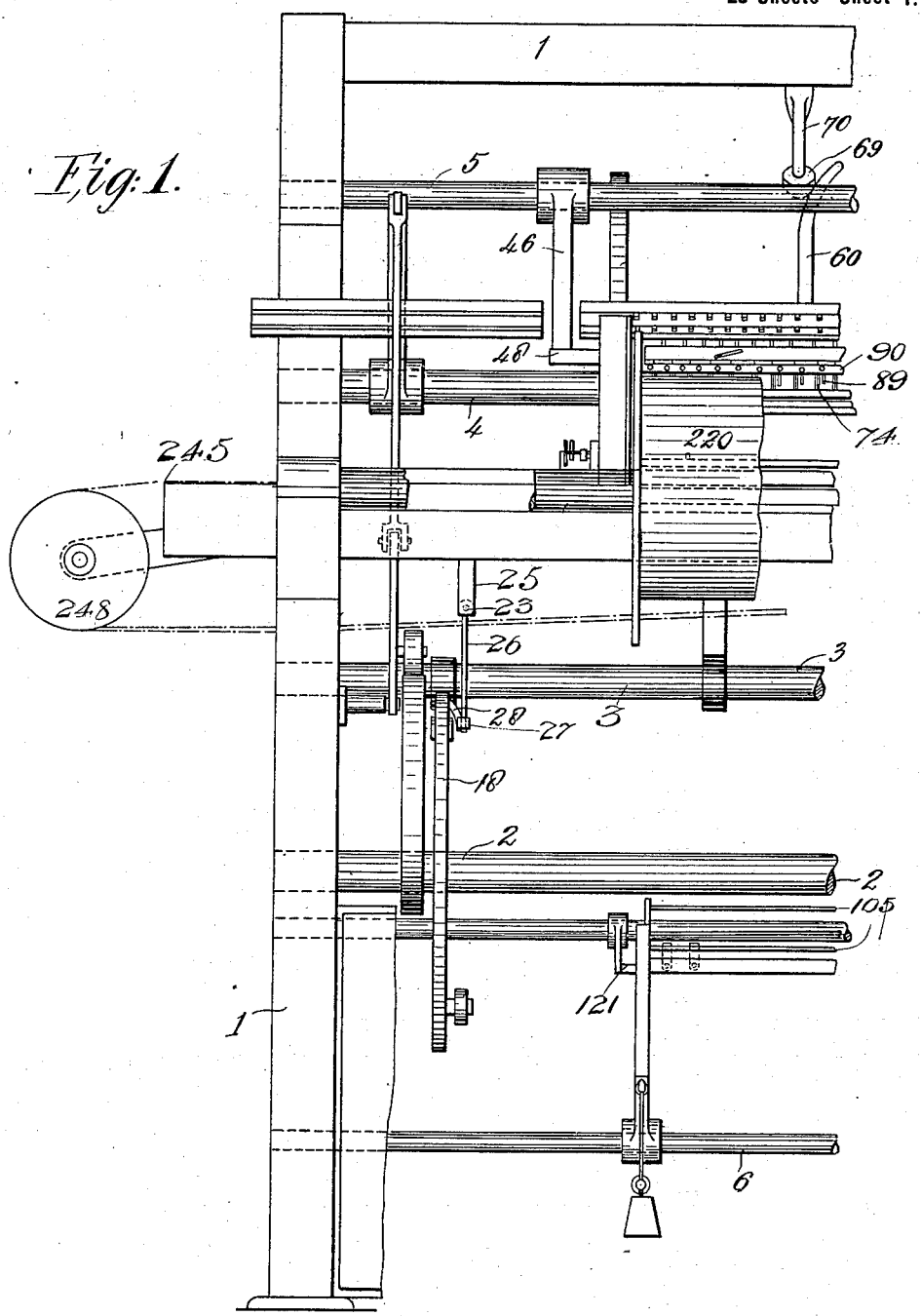
Figure 27:
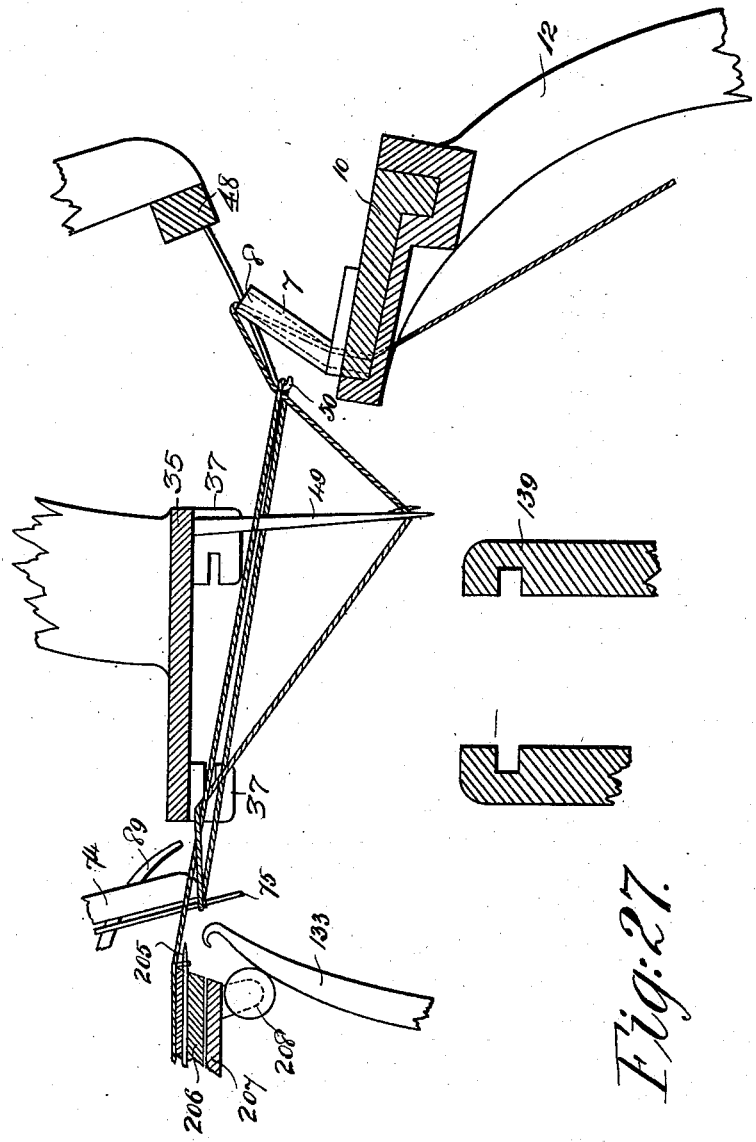
Figure 28:
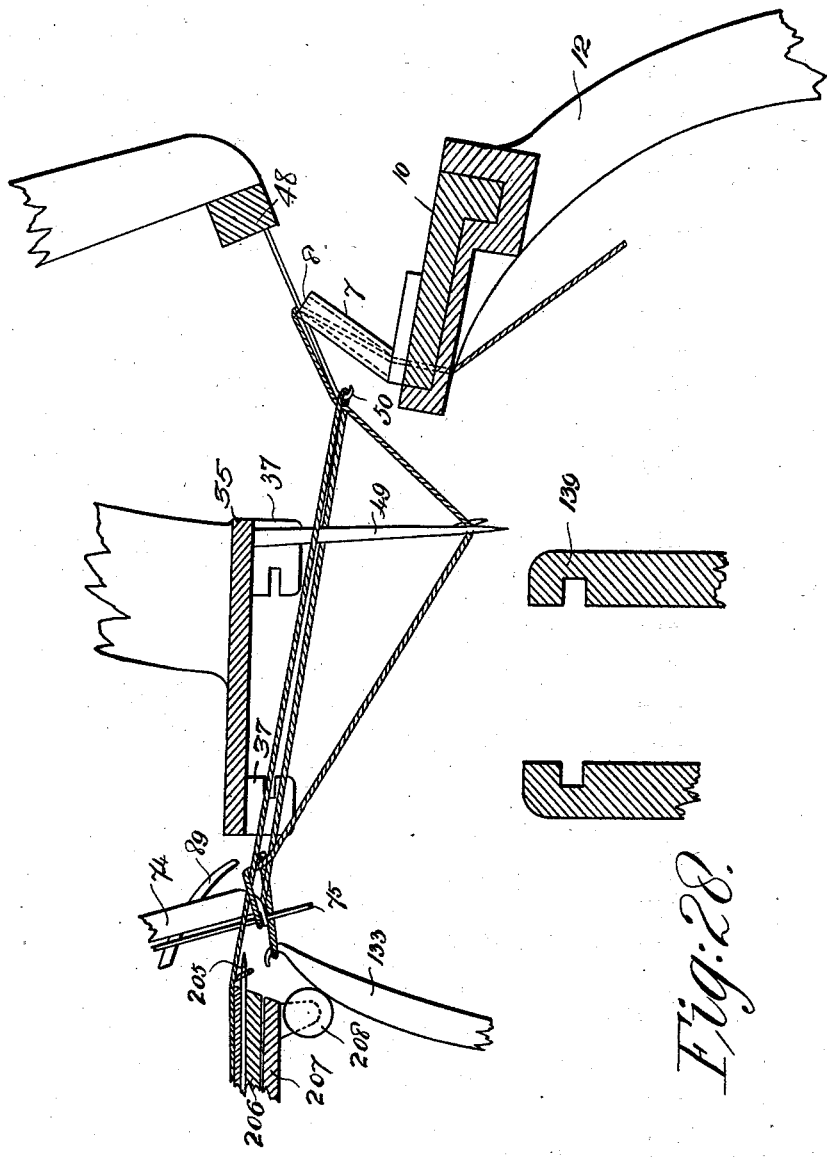

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 1.

Witnesses
Edwin Drew Bartlett
Leonard E. Haynes.

Inventors
Henry Arthur Rendall, William George Ackerman
per Hubert Sefton Jones
Attorney No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 2.
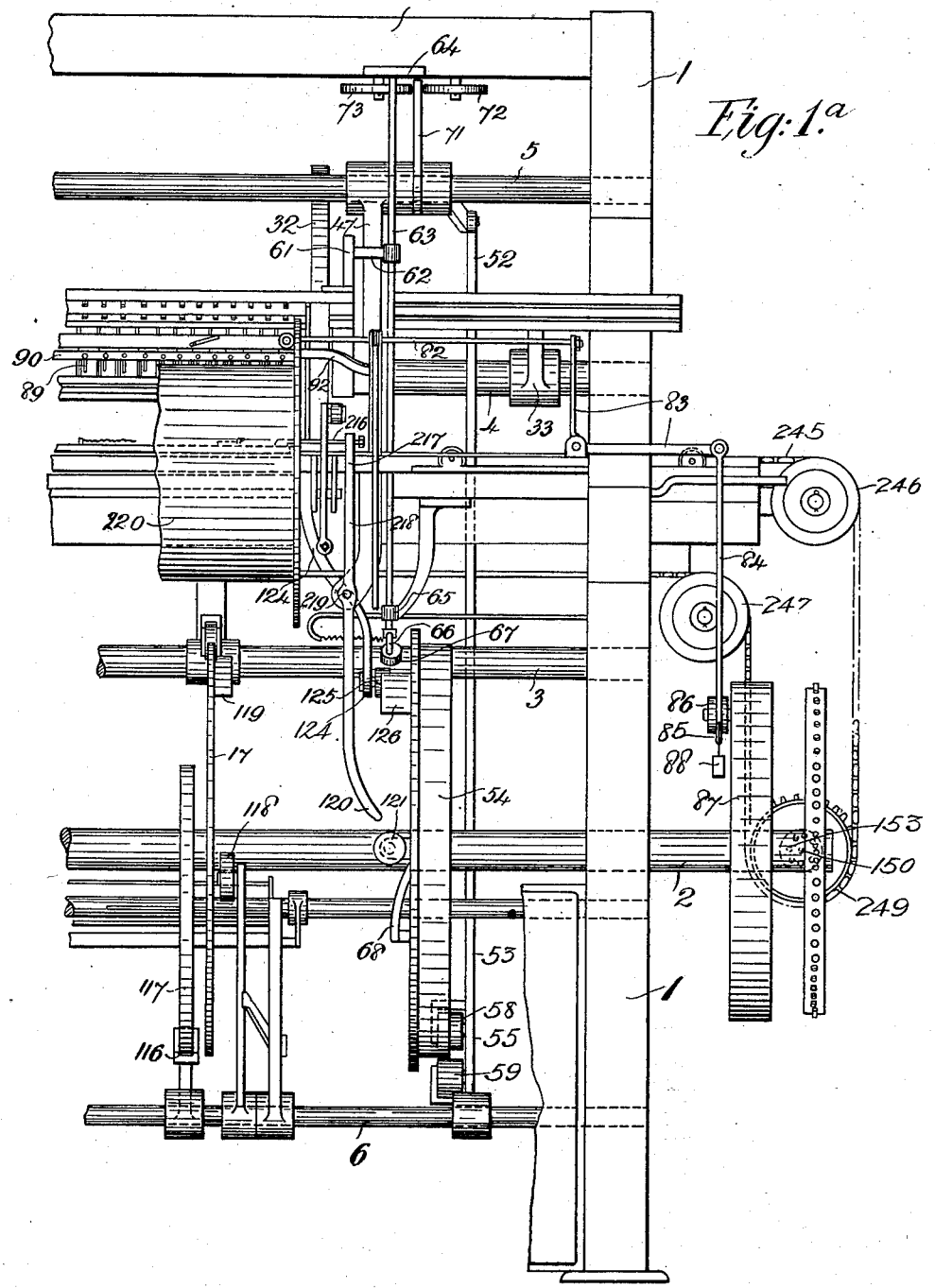
Fig: 1.ª
Witnesses
Edwin Drew Bartlett
Frank J. Ames
Inventors
Henry Arthur Rendall William George Ackerman
per Herbert Sefton-Jones
Attorney No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 3.
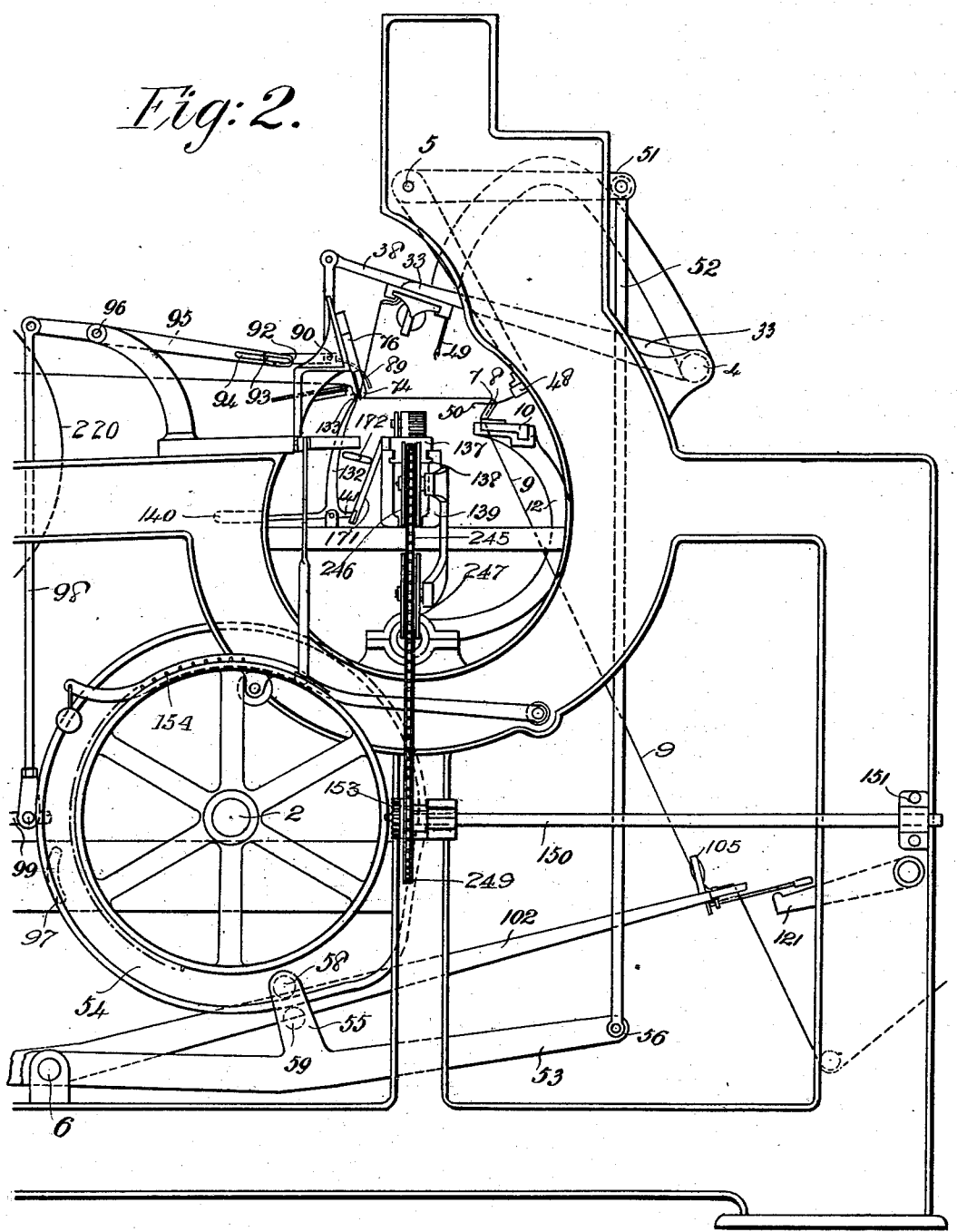
Fig: 2.
Witnesses
Edwin Drew Bartlett
Frank J. Ames
Inventors
Henry Arthur Rendall, William George Ackerman
per Herbert Sefton-Jones
Attorney.

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 4.
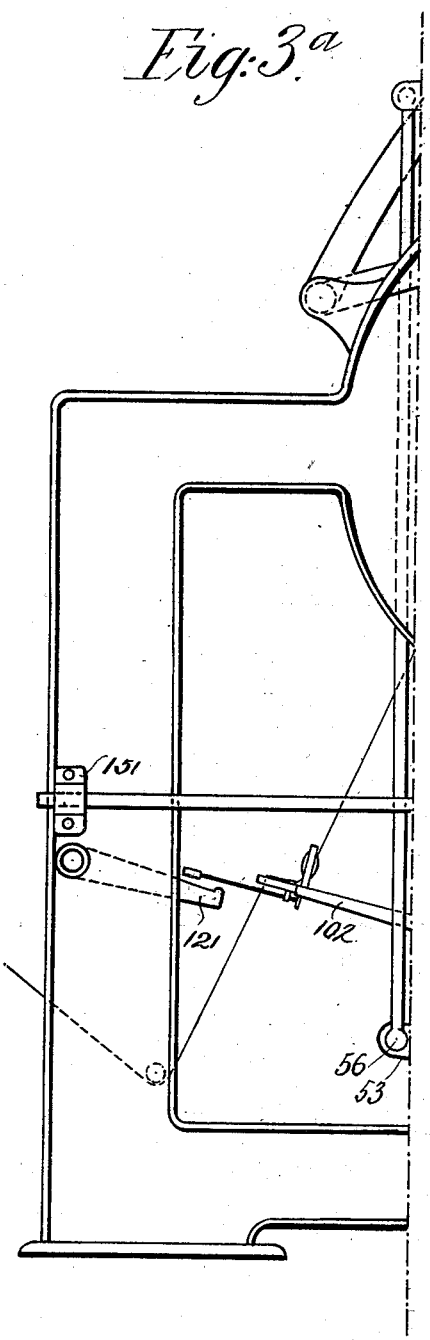
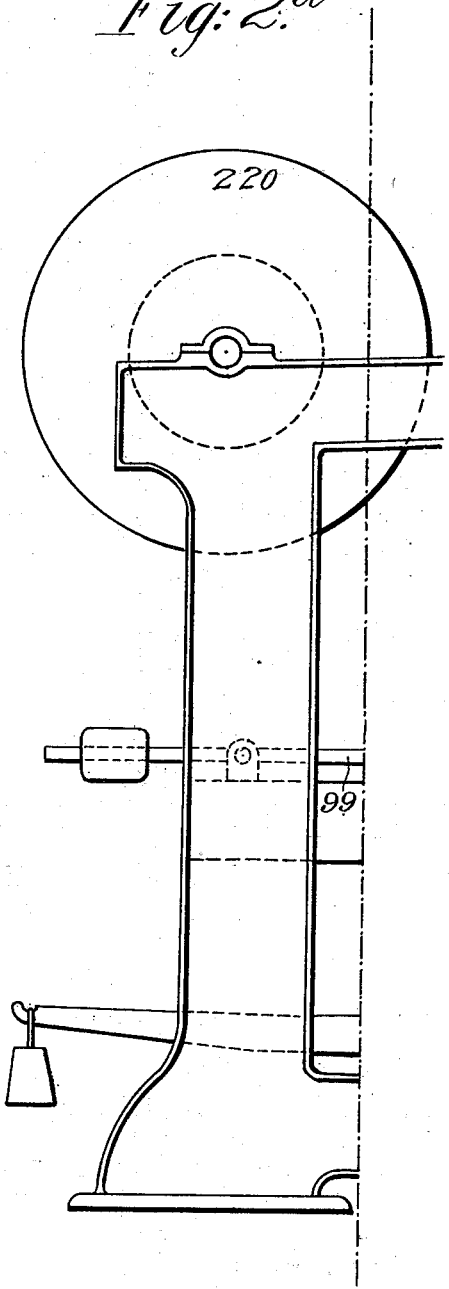

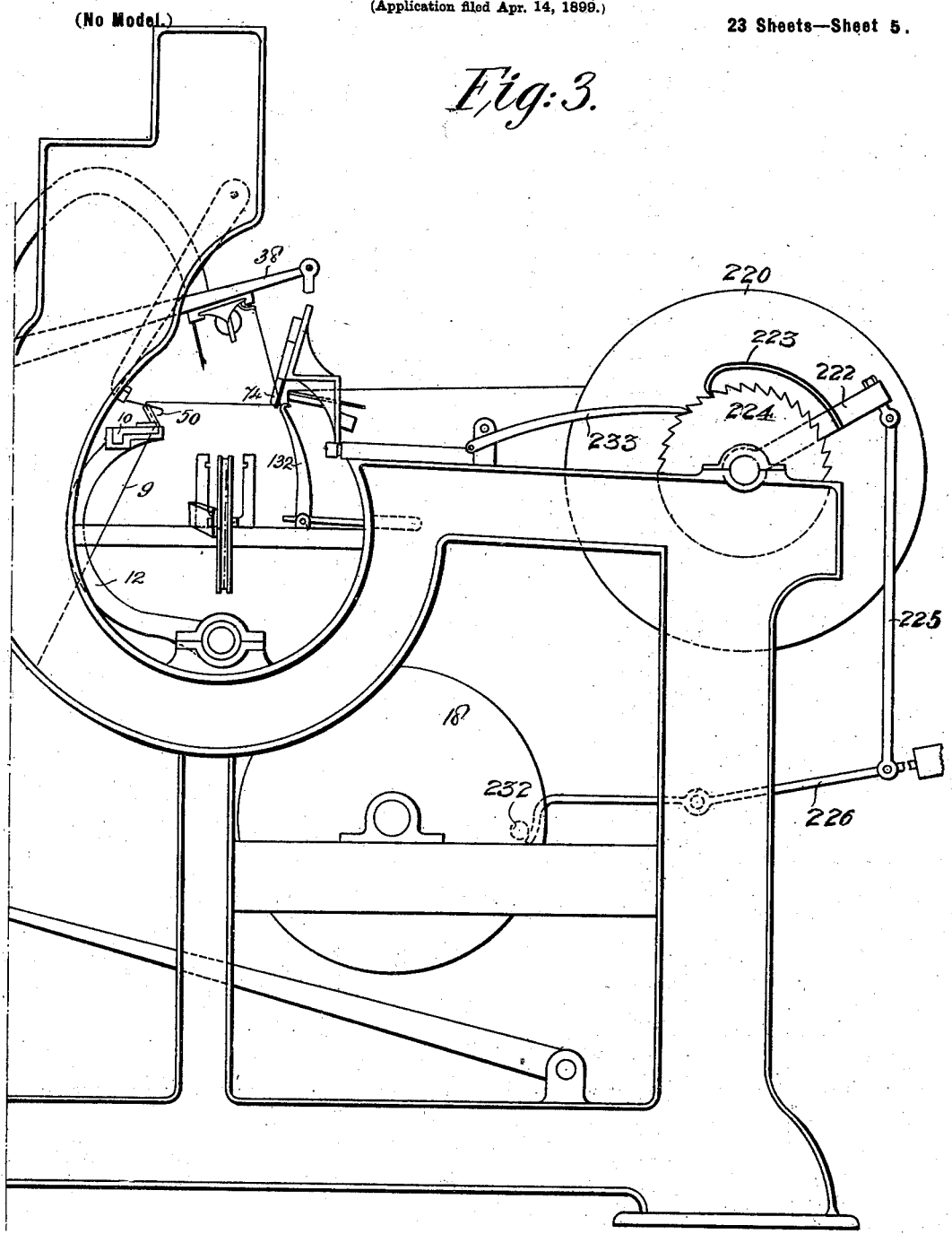

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 6.
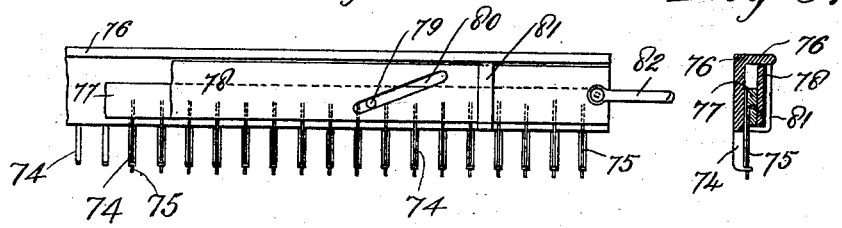
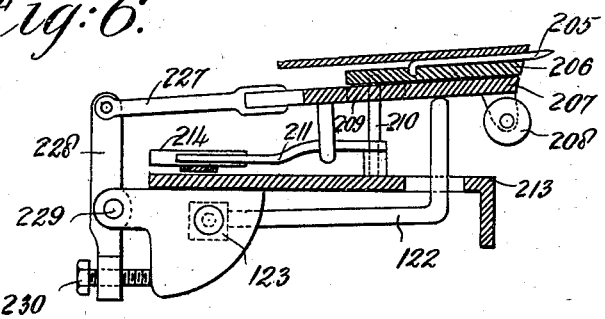
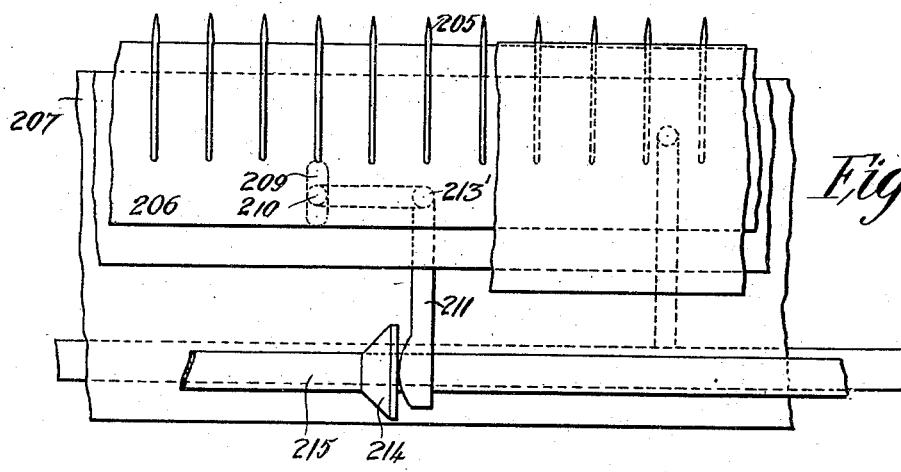

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 7.
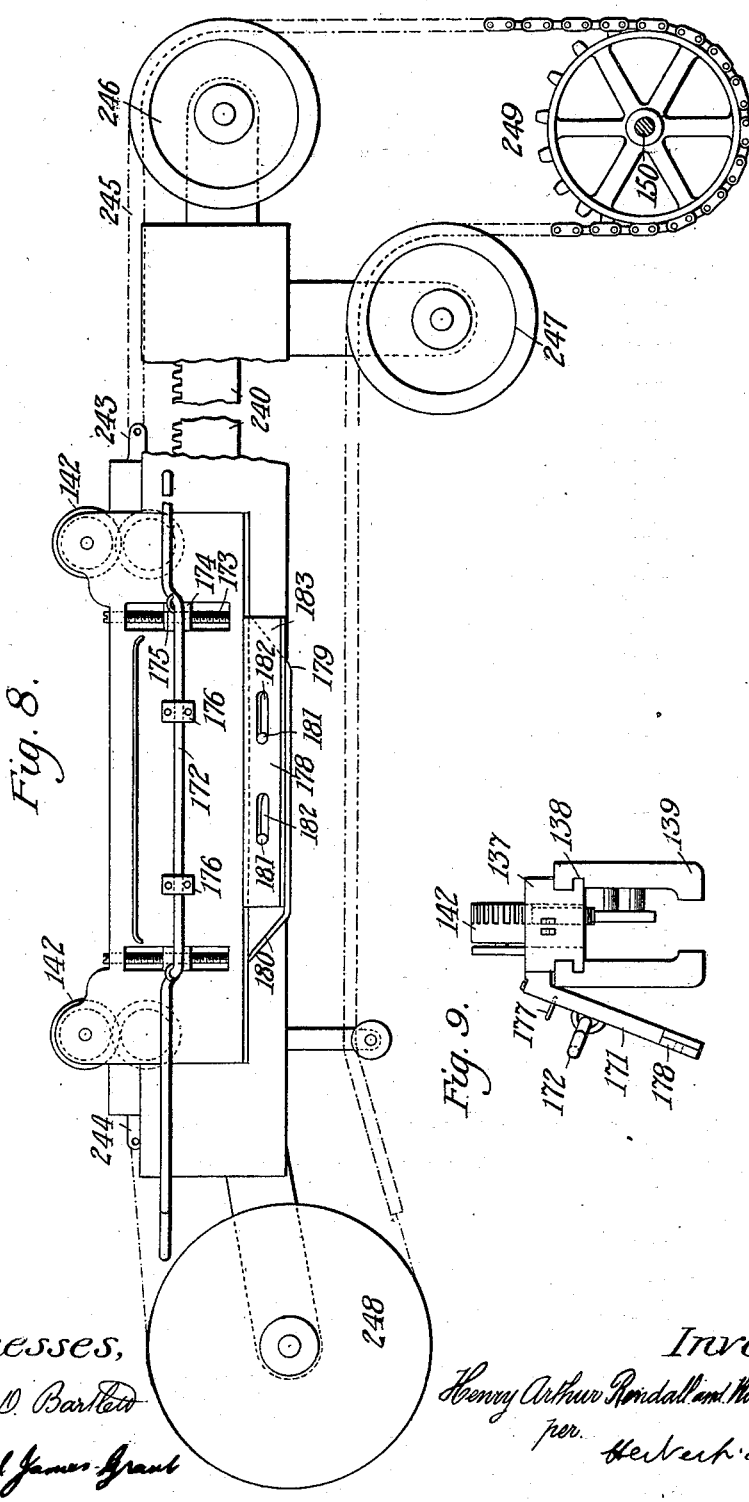

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 8.
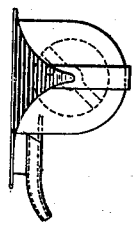
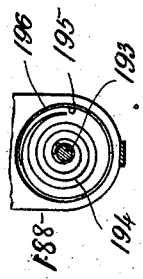
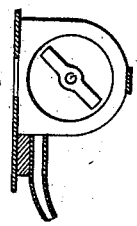
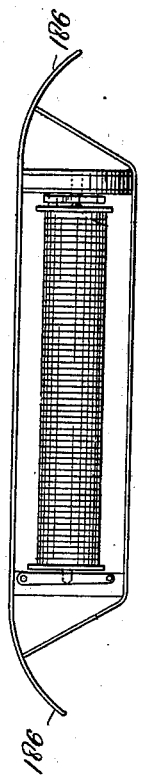
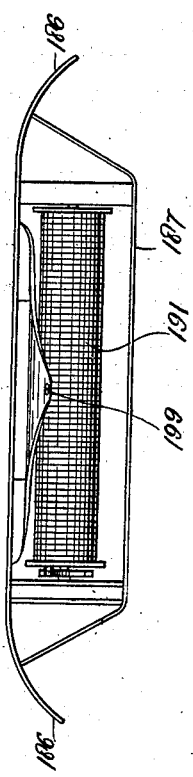
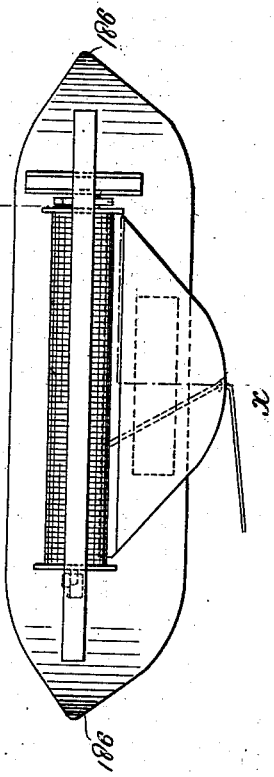

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 9.
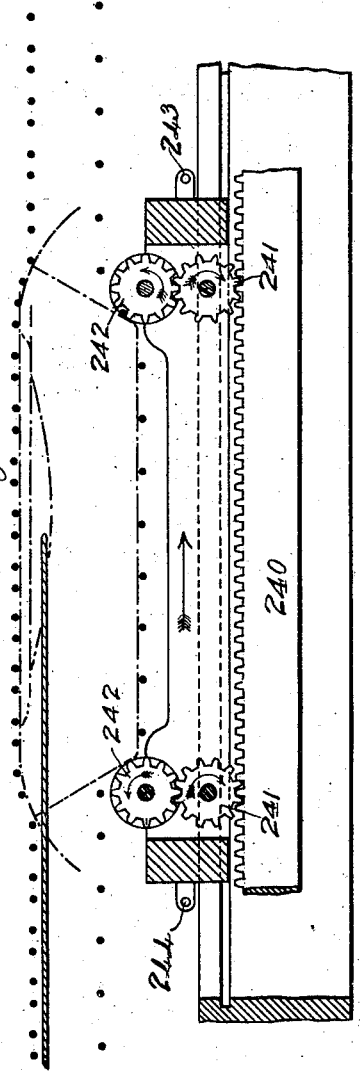
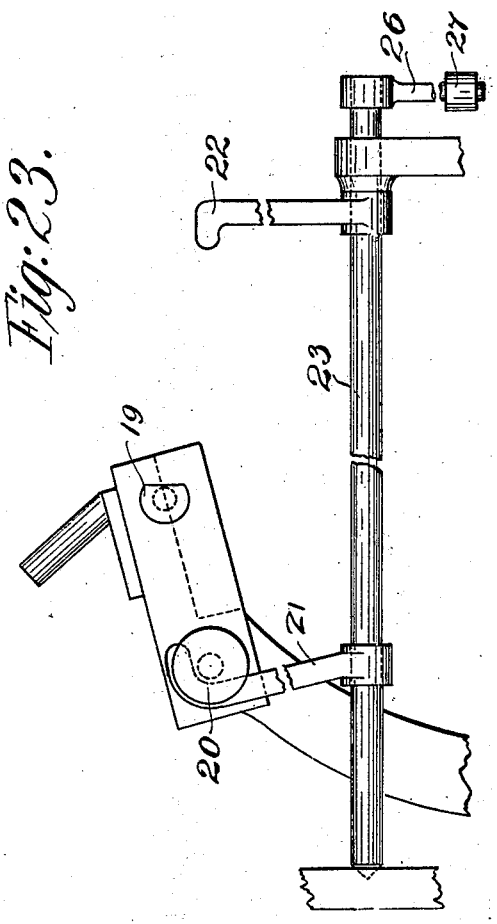

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 10.
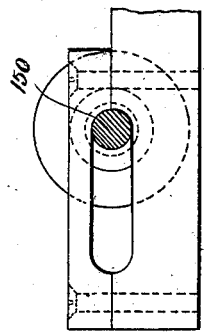
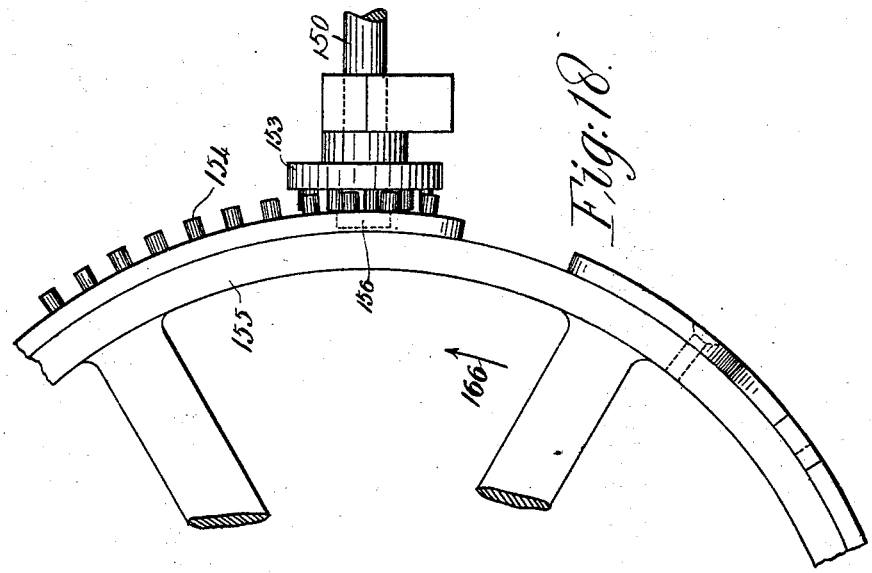
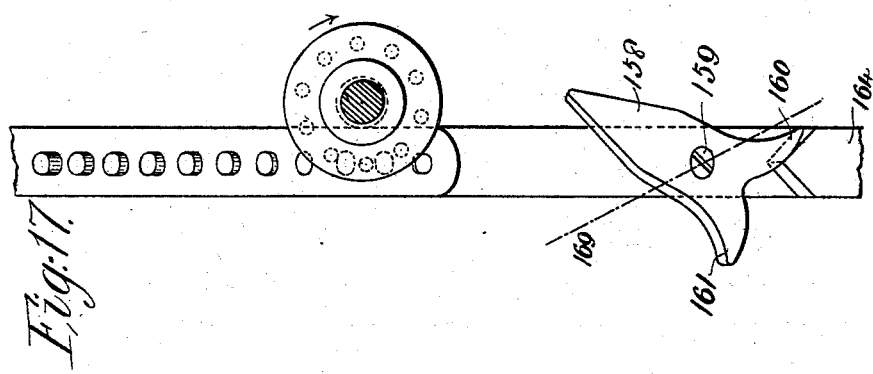

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 11.
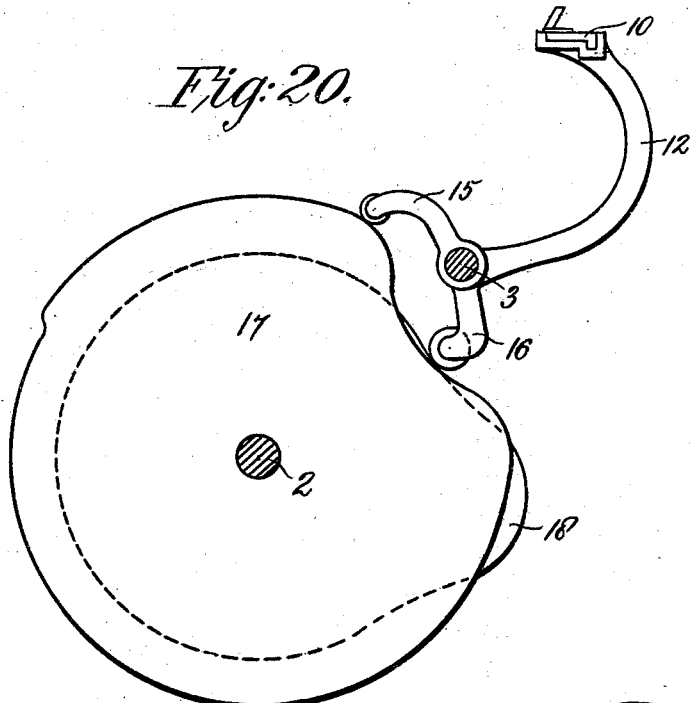
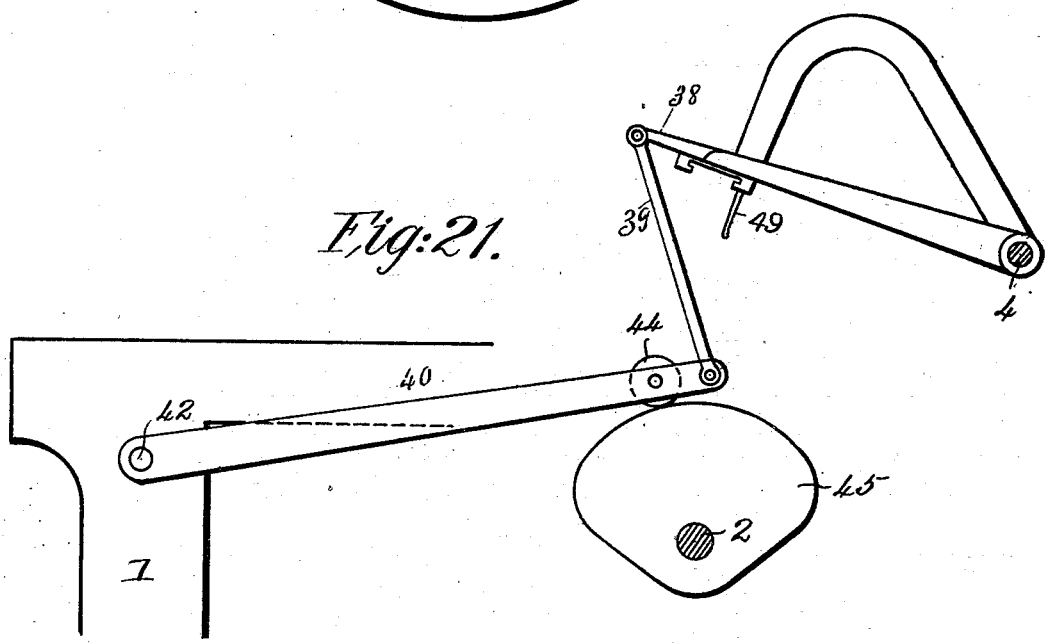
Witnesses
Edwin Drew Bartlett
Roland James Grant
Inventors
Henry Arthur Rendall William George Ackerman
Herbert Sefton-Jones No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 12.
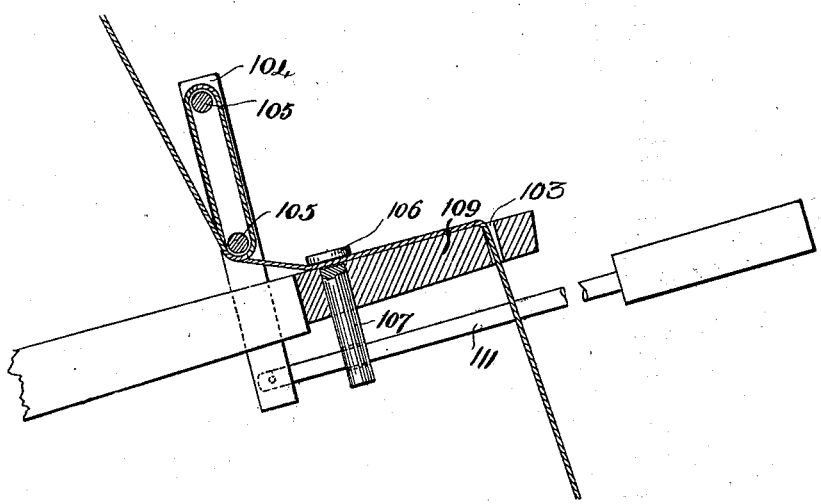
Fig: 22.
Witnesses
Inventors
Henry Arthur Rendall William George Ackerman
per Herbert Sefton-Jones
Attorney No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 13.
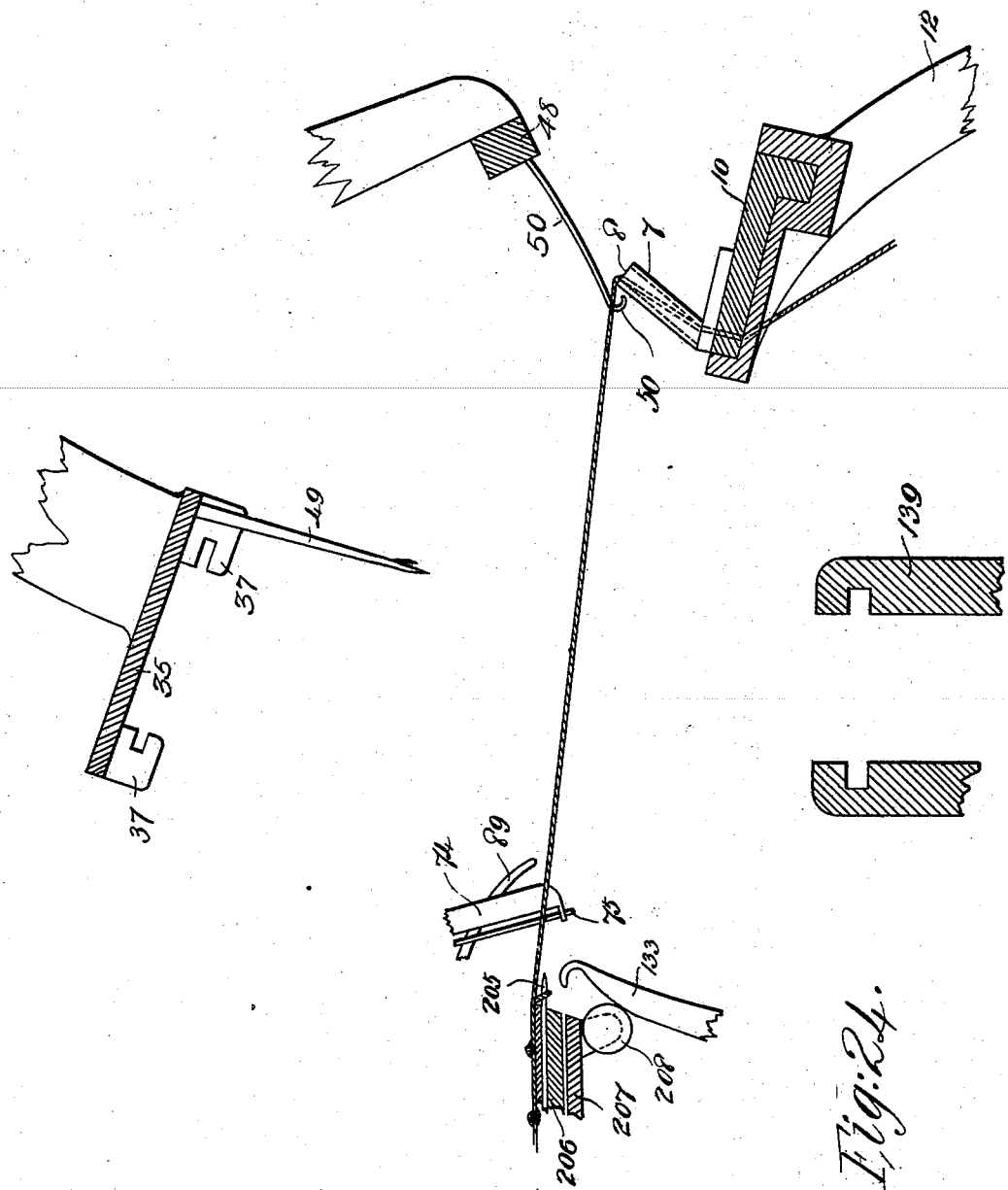

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 14.
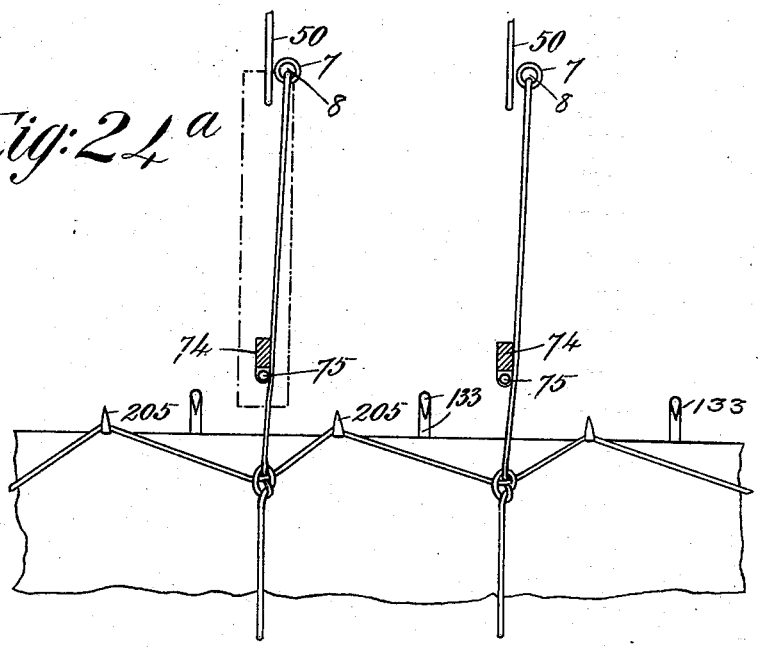
Fig: 24.ª
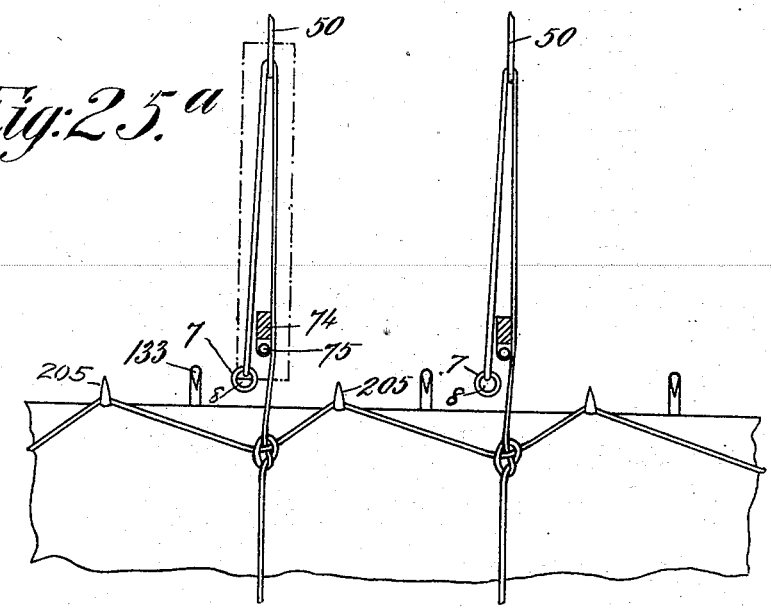
Fig: 25.ª
Witnesses
Edwin Drew Butler
Roland James Grant
Inventors
Henry Arthur Rendall
William George Ackerman
By Herbert Sefton Jones
Attorney

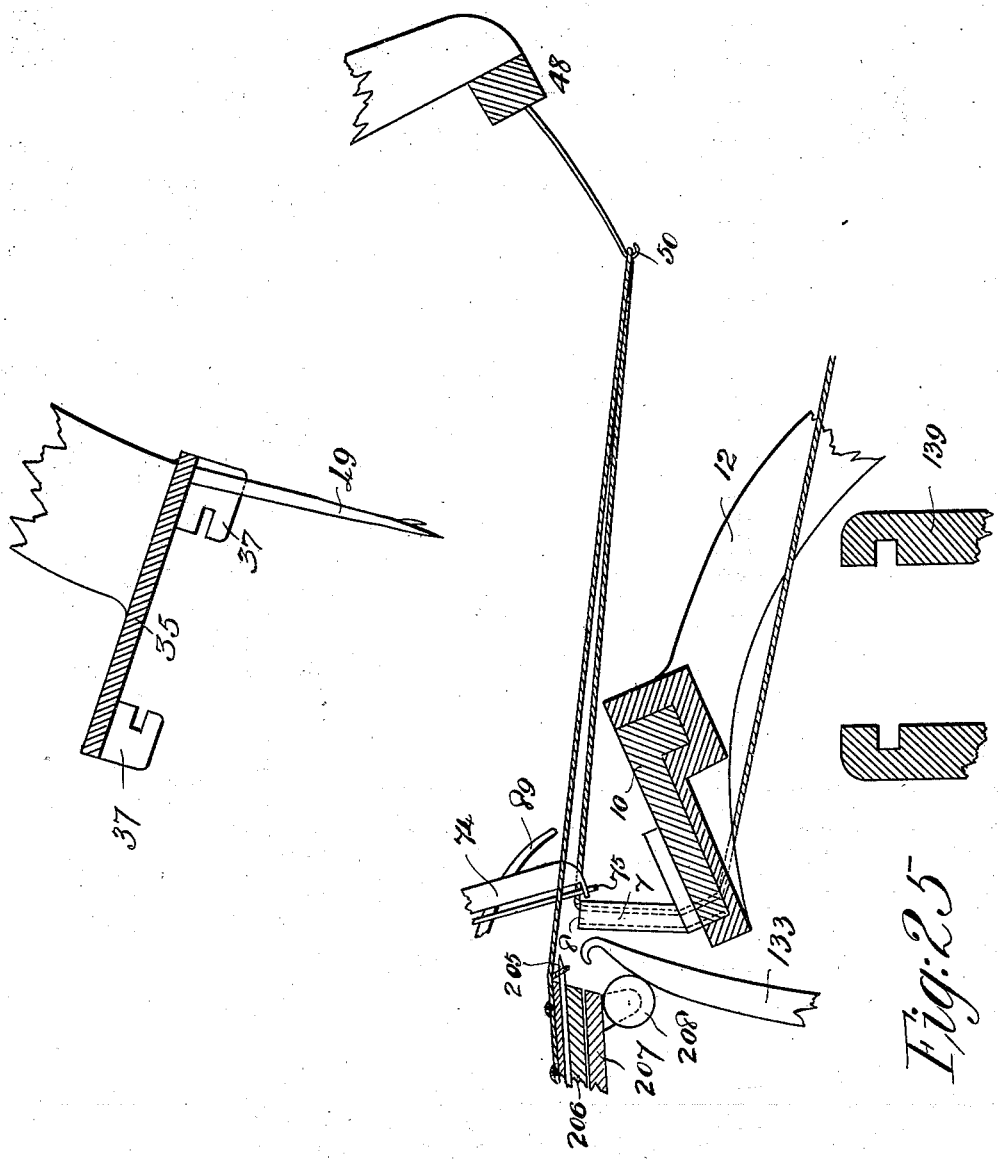

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 16.
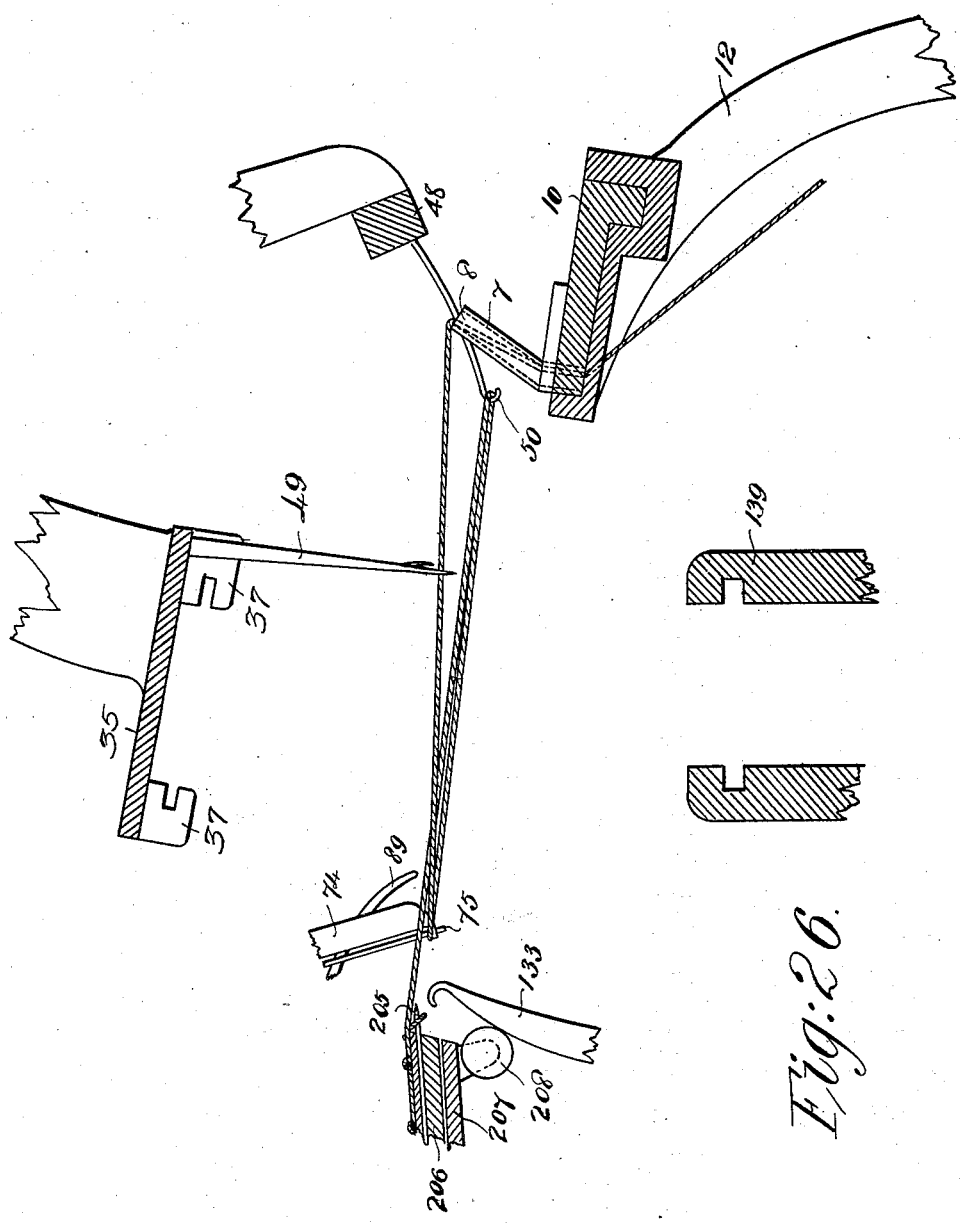

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 17.
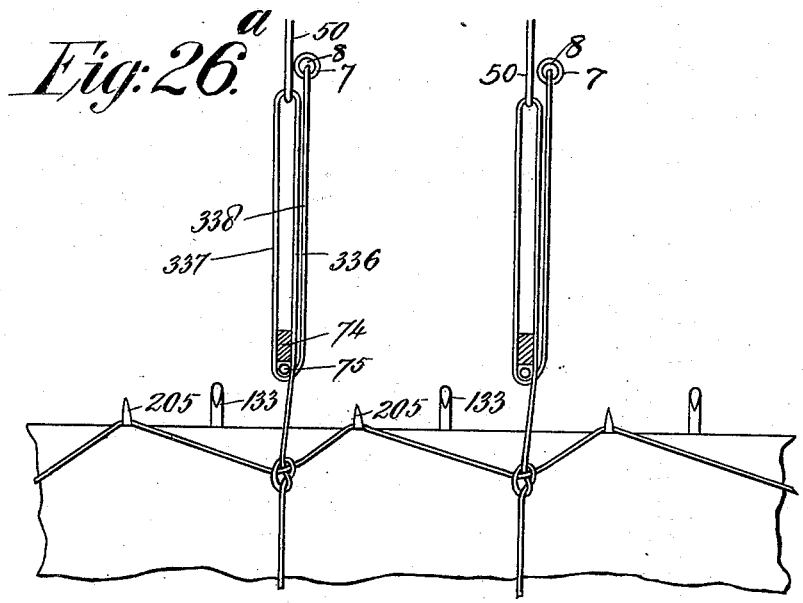
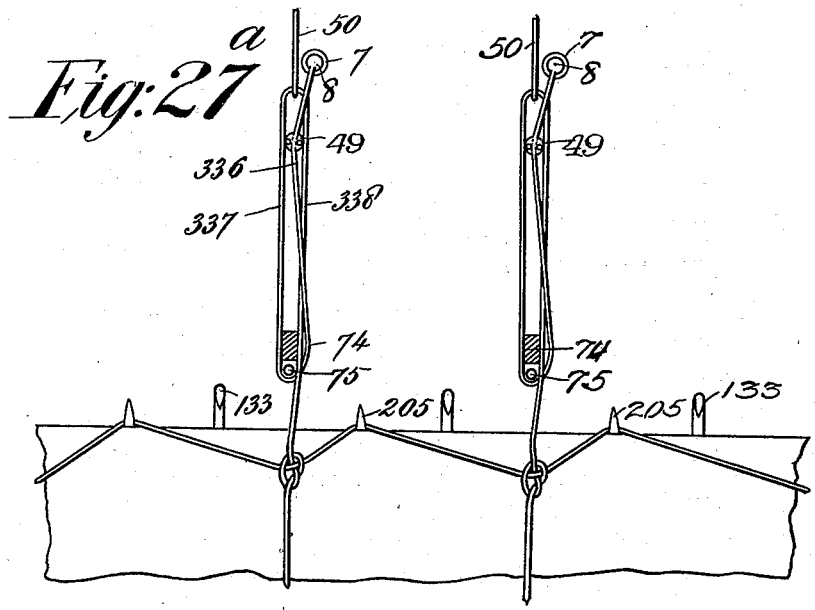
Witnesses
Inventors
Henry Arthur Rendall
William George Ackerman
By Herbert Sefton-Jones
Attorney No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)

(No Model.) 23 Sheets—Sheet 18.

Witnesses
Edwin Drew Bartlett
Frank J. Ames

Inventors
Henry Arthur Rendall, William George Ackerman
per Herbert Sefton Jones
Attorney No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 19.

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 20.

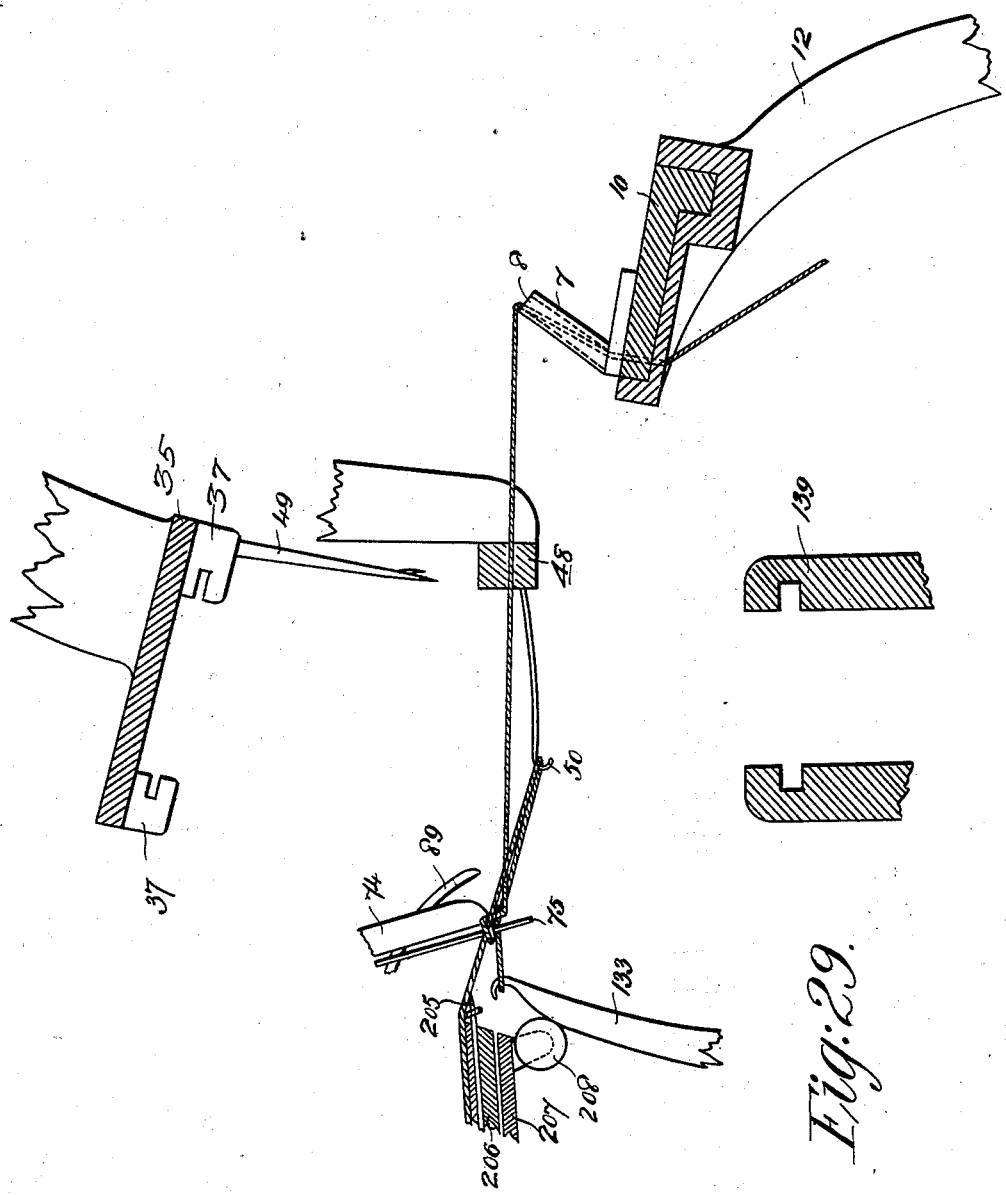

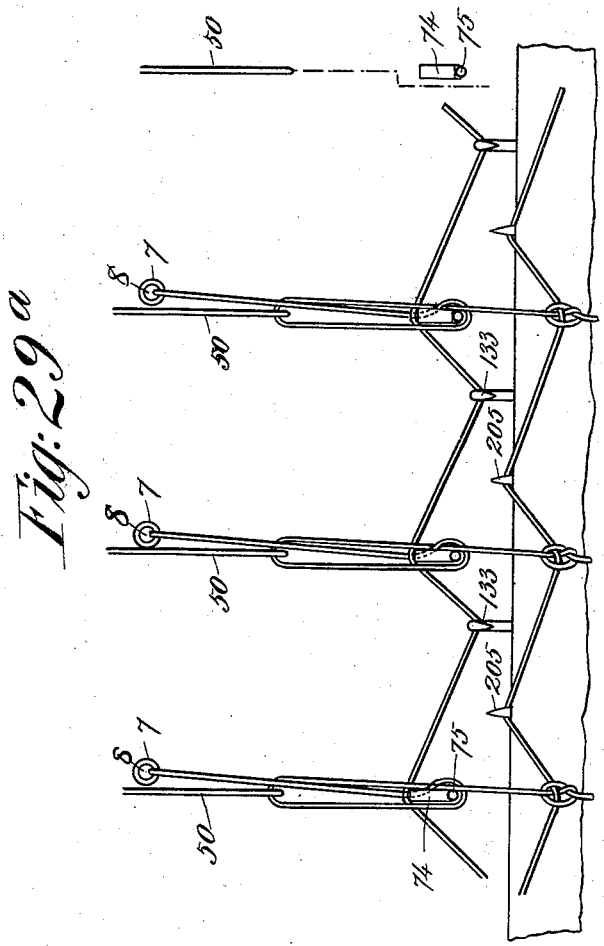

No. 664,433. Patented Dec. 25, 1900.
H. A. RENDALL & W. G. ACKERMAN.
MACHINE FOR WEAVING RECTANGULAR MESHED NETTING.
(Application filed Apr. 14, 1899.)
(No Model.) 23 Sheets—Sheet 23.
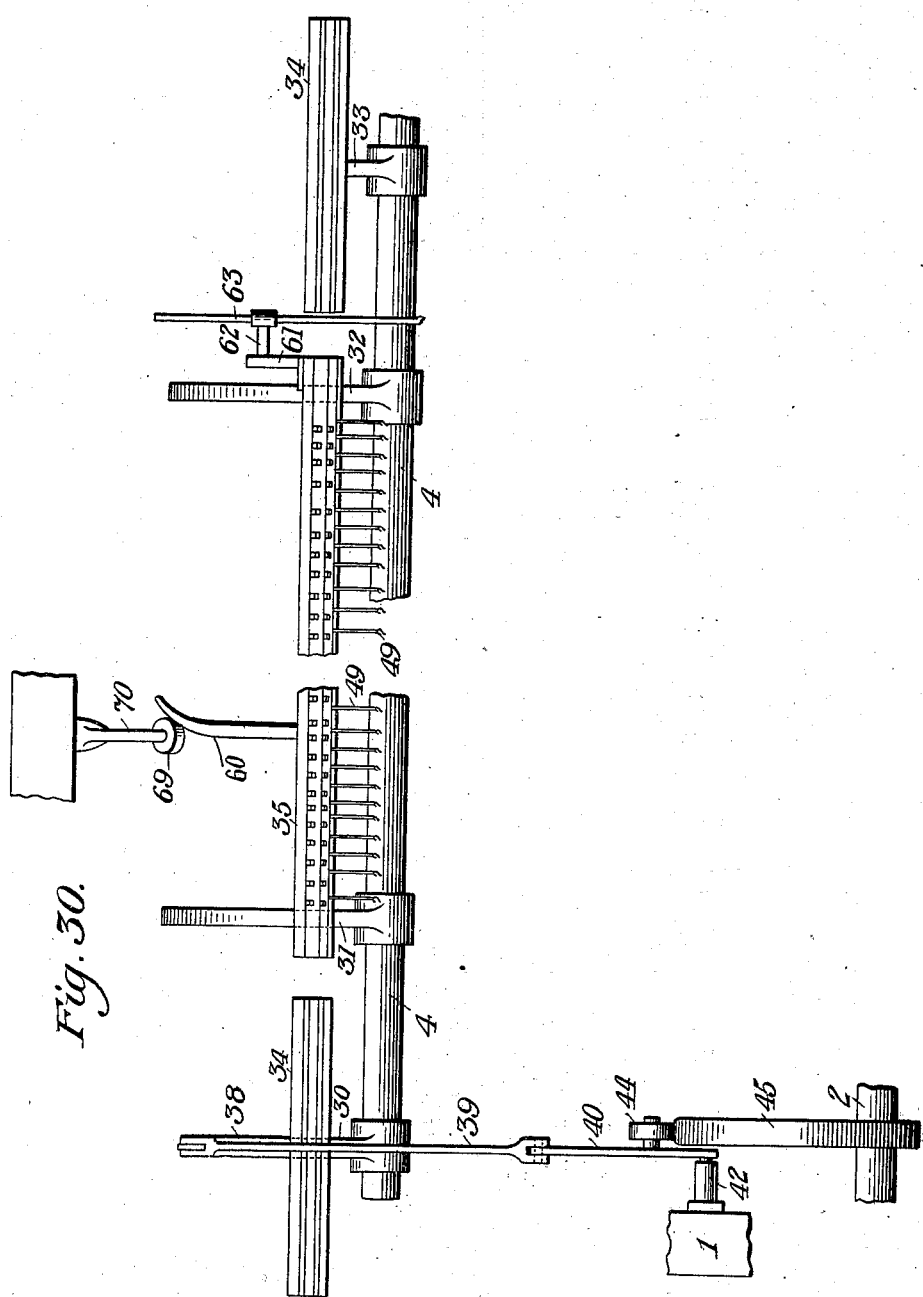

UNITED STATES PATENT OFFICE.

HENRY ARTHUR RENDALL AND WILLIAM GEORGE ACKERMAN, OF BRIDPORT, ENGLAND; SAID ACKERMAN ASSIGNOR TO SAID RENDALL.

MACHINE FOR WEAVING RECTANGULAR-MESHED NETTING.

SPECIFICATION forming part of Letters Patent No. 664,433, dated December 25, 1900.

Application filed April 14, 1899. Serial No. 713,035. (No model.)

*To all whom it may concern:*

Be it known that we, HENRY ARTHUR RENDALL and WILLIAM GEORGE ACKERMAN, subjects of the Queen of Great Britain, residing at Bridport, in the county of Dorset, England, have invented a new and useful Machine for Weaving Rectangular-Meshed Netting, (for which we have obtained Provisional Protection in Great Britain, No. 20,349, dated September 26, 1898,) of which the following is a specification.

Our invention relates to an improved machine for weaving rectangular-meshed netting having true "fishermen's" knots of the type patented by us in Great Britain, No. 9,630 of 1890.

By our invention we produce a square or rectangular mesh having true firm knots which has hitherto only been practically attainable by hand-labor. In addition to a great saving in time and labor we are able to produce several widths of net on one machine at the same time, each width having perfect selvages. We can, moreover, produce various sizes of mesh on one machine by means of a simple adjustment. Moreover, our machine will produce good netting with almost every kind of filiform material.

Machines have been patented for producing a meshed fabric without firm knots; but such fabrics are merely capable of use as textile materials and cannot be applied for the purpose of netting, which is the object of our invention. Further, machines have been patented for producing diagonal-meshed netting of the ordinary kind by machinery. Such machinery differs essentially from our invention. In all these prior patents the inventors contemplate the construction of each loop separately, inasmuch as they have as many shuttles or equivalent devices for throwing the weft as there are meshes in the width of the fabric and each knot is tied separately by its own separate apparatus.

Our machine has for its object the forming of true fishermen's knots in a fabric of desired width by the aid of a row of organs, each taking hold of one of the threads of the warp, in coöperation with a single shuttle carrying the weft-thread through the shed formed by the movement of the warp-threads, the said shuttle mechanism being devised to act on the tumblers in the rear of the shuttle and to cause them to take hold of the weft and return to their initial position in order to form a fresh row of loops. It is the special means for the effective coöperation of the set of knot-forming organs with a single shuttle which form the principal constructional novelty in our machine. These means include the arrangement hereinafter described, whereby on the withdrawal of the moving receiving-pins attached to a single plate running the whole length of the machine at one single motion the entire row of knots is released and drawn tight after the passage of the shuttle.

Our invention is illustrated in one modification, by way of example, in the accompanying drawings, in which—

Figure 1 is a front view of the left half of the machine. Fig. 1$^a$ is a front view of the right half of the same. Fig. 2 is the right-hand portion of the right-hand end elevation of the machine. Fig. 2$^a$ is the left-hand portion of the same. Fig. 3 is the right-hand portion of the left-hand end elevation of the machine. Fig. 3$^a$ is the left-hand portion of the same. Fig. 4 is a front view, and Fig. 5 a section, of the arrangement for lifting the knotting-pins. Fig. 6 is a section of the mesh-governor, and Fig. 7 is a plan of the same. Fig. 8 is a front elevation of the shuttle carrier and guide with driving-chains removed from the machine. Fig. 9 is an end view of the same. Figs. 10 and 11 are elevations of the shuttle. Fig. 12 is a plan view of the shuttle. Fig. 13 is an end elevation. Figs. 14 and 15 are sections of the same. Fig. 16 is a diagram illustrating the passage of the shuttle through the loops of the warp-threads. Figs. 17, 18, and 19 are details of the shuttle-carrier-reversing mechanism. Figs. 20, 21, 22, and 23 are details of the mechanism on an enlarged scale. Figs. 24 to 29 are diagrams illustrating the formation of the loop in side view. Figs. 24$^a$ to 29$^a$ are corresponding diagrams in plan view. Fig. 30 is an elevation of the arms 30, 31, 32, and 33 on the shaft 4 and the mechanism connected therewith.

The operative parts of the machine comprise, first, a warp-guide and tension mechanism; second, slip-hooks 50 for engaging the warp; third, depressors 49 for opening the loop; fourth, movable knotting-pins 75; fifth, receiving-pins 205 and mesh-governor; sixth, tumblers 132 and shuttle-carrier; seventh, shuttle 184, and, eighth, take-up roller 220.

Referring to the above-mentioned drawings, the machine-frame 1 is shown in Fig. 1 as partly broken away, so as to give a general view of both ends of the machine. The right-hand end of the machine is shown in elevation in Fig. 2 and the left-hand end in elevation in Fig. 3, duplicate parts being omitted for the sake of clearness.

The operative parts of the machine are set in motion by means of shafts—namely, the main shaft 2, the guide-arm shaft 3, the depressor-shaft 4, the slip-hook shaft 5, and the tension-arm shaft 6. Each of these sets of mechanism will be described in its turn.

*First. The warp-guide and tension mechanism.*—The warp-threads 9 are of course as many in number as the width of the fabric of the net to be woven requires. These warp-threads are arranged in a row the whole width of the machine. They are moved to and fro by an equal number of guides 7, each having a hole 8, in which the respective warp-thread passes. These guides 7 are mounted upon the bar 10, which bar can move longitudinally in both directions. Its bearings are carried by two guide-arms 12, which are attached to the shaft 3. This shaft is shown in the drawings as operated by rocking levers 15 and 16, actuated by cams 17 18, keyed upon the shaft 2. (See Fig. 20.) These cams are placed side by side, and each rocking lever engages with its respective cam.

In order to obtain the proper right-to-left and left-to-right motion of the bar 10, and consequently of the warp-threads, projections 19 and 20, Fig. 23, are provided upon its left-hand end, operated by the arms 21 or 22, respectively, on shaft 23, which has secured upon it at one end the arm 26, projecting downward and having at its end a roller 27, operated by contact with the cam-piece 28 on the cam 18, whereby the shaft 23 is rocked and the bar 10 is moved in its bearings, the cam 28 coming in contact with the roller 27 causing the shaft to rock and one of the levers 21 or 22 (of which 21 pulls and 22 pushes) to strike one of the two stops 19 20, and thus move the bar 10 alternately to left and right at each revolution of the shaft 2. This portion of the mechanism is not shown in Fig. 3 for the sake of clearness, but is fully illustrated in Fig. 23.

*Second. The tension mechanism.*—This mechanism comprises a pair of bars 102, (rocking on the shaft 6,) each bearing at its free end a vertical bar 104, supporting two rods 105, which extend the entire width of the machine. Around these bars pass the warp-threads, each passing up through an aperture 103 in a plate 109, likewise attached to the bars 102 and extending the length of the machine. The plate 109 carries the bolts 107, one for each warp-thread, which passes through the hole 106 therein. As long as the bolt 107 is held down by the weighted lever 111 the warp-thread is held fast by the head of the bolt 107. The lever 111 is controlled by the arm 116, Fig. 1ª, on the shaft 6 under the action of the cam 117 on the shaft 2. The revolution of the cam 117 is devised to depress the arm 116 at each revolution. The arm 116 is maintained pressed up against the periphery of the cam 117 by the action of a counterweight fixed to a projection rigidly attached to the shaft 6. When the cam 117 depresses the arm 116, it causes the bar 102, which is keyed on the shaft 6, to be also depressed, so as to allow the weighted lever 111 to rest on the bar 121, and releases the warp-threads, which can then be freely drawn through the guides 7 on the bar 10, as above described.

*Third. The slip-hook mechanism.*—The slip-hook shaft 5 has keyed upon it the arms 46 and 47, which support the slip-hook bar 48, Fig. 1. This bar 48 has fixed upon it the slip-hooks 50. The necessary movement is imparted to the shaft 5 by the lever 51, connecting-rod 52, the rocking lever 53, and the cam 54, Fig. 2. The rocking lever 53 has an arm 55 projecting from it midway between the end 56 and the shaft 6. The said projection 55 has mounted upon it two rollers 58 and 59, which respectively engage with the inside and outside of the cam-surface of the cam 54. In order to shog the slip-hooks 50, the arm 71 is fast to the shaft 5. Consequently the arms 47 48 being integral with the shaft 5 and bearing the slip-hook bar 48 are moved together with the shaft 5 when the aforesaid arm 71 is shogged. The roller 72 shogs the slip-hooks 50 to the left when coming forward, and the roller 73 shogs the slip-hooks 50 to the right when returning to commence a new loop.

*Fourth. The depressor mechanism.*—The depressor-shaft 4 has keyed upon it four arms 30 31 32 33, which support the shuttle-guide 34 and depressor-bar and shuttle-guide 35, Figs. 1, 2, 21, and 30. The arms 30 and 33 are connected to the shuttle-guides 34, and the arms 31 and 32 are connected to the shuttle-guide and depressor-bar 35. The bar 35 has guides 37 spaced apart, so as to allow the threads of the warp forming the loops to pass up between them during the passage of the shuttle through the shed.

In order to obtain the necessary movement of the arms 30 31 32 33, the arm 30 is prolonged farther outward, as at 38, and has attached to it a rod 39, which is in turn connected to a lever 40. One end of this lever 40 is pivoted to the frame 1 of the machine at 42, and attached to it is an antifriction-roller 44, running upon a cam 45, keyed upon the shaft 2. This cam is of such a shape that during the passage of the shuttle through the shed the depressors 49 are down and at rest, and during the forward and backward movement of the guides 7 the depressors are up and at rest. The depressor-shaft 4 is given a certain amount of lateral play in the bearings in order to allow of the depressors 49 being shogged to the left and back again for the purpose hereinafter described. In order to obtain this shogging movement, the depressor-bar 35 has two projections 60 and 61 secured thereto, the projection 61 being struck by the arm 62, fast to the vertical rod 63, supported in journals at 64 and 65. The lower end of the said rod 63 terminates in a bent arm 66, with roller 67, which is actuated by the projection 68 upon the side of the cam 54 and tends to shog the depressor-bar 35 to the left. The depressor-bar 35 is returned to its normal position by the striking of the curved lever 60 against the roller 69 on the fixed arm 70, which is itself secured to the frame of the machine. By this means as the depressor-bar 35 rises it is shogged to the right into its normal position.

*Fifth. The movable knotting-pins.*—The movable knotting-pins 75 are secured to a plate 77, provided with pins 79, Figs. 4 and 5. A plate 78, with upwardly-inclined slots 80, is arranged for the purpose of raising the plate 77, with the knotting-pins 75 attached thereto, and the guides 81 are provided therefor. The plate 78 is actuated by the rod 82, secured to it, the bell-crank lever 83, the rod 84, and the lever 85. A roller 86, secured to the wheel 87, operates the bent lever 85 to raise it, and a weight 88 serves to return the lever to its original position.

Brushing-pins 89 are secured to the bar 90 and are operated at the completion of the knot to tighten the same by the projecting arm 92, having a pin 93, working in the groove 94 in a rocking arm 95, said arm rocking in bearings 96, supported by the frame of the machine. The end of the lever 95 is pivoted to a rod 98, attached to the weighted lever 99, and a projection 97 on the cam 54 strikes the end of lever 99 and lifts it immediately after the receiving-pins have been withdrawn.

*Sixth. The receiving-pins and mesh-governor mechanism.*—The receiving-pins 205, Figs. 6 and 7, are secured to a plate 206, resting on a plate 207. This plate 207 has a roller 208 at its under surface, near the right-hand end. The plate 207 has a slot 209 to allow the pin 210 to pass up through it to the plate 206. The vertical pin 210 projects from a bell-crank lever 211, working on a pin 213', secured to the plate 213. One end of the bell-crank lever strikes against an angle-piece 214, which is secured to a sliding bar 215, Fig. 7. The sliding bar 215 is actuated by the rod 216, attached to the end 217 of a rocking lever 218, working in bearings 219. The other end 120 is actuated by the roller 121, secured to the cam 54 by coming in contact with it at each revolution of the cam. The said plate 207, forming part of the mesh-governor or apparatus for regulating the size of the mesh, consists of a flat plate extending the entire width of the machine. The mesh-governor regulates the size of the mesh by raising or depressing the roller 208, the position of which roller regulates the distance of the forward stroke of the tumblers, and consequently determines the length of the loop forming the mesh. It is raised and lowered by rocking arms 122, secured to a bar 123, running lengthwise of the machine. The bar 123 is actuated by an arm 124, Fig. 1ª, provided with a roller 125, which strikes against a cam-piece 126, secured to the cam 54. The operative or right-hand side of the mesh-governor plate 207 bears the roller 208, as stated above, while its left-hand side has a pair of arm-pieces 227, connected to rocking levers 228, rocking on pivots 229. The other end of each rocking lever is provided with a set-screw 230, which bears against the bracket-piece 231, which is secured to the plate 213 and supports the said pivots 229. The bracket-piece 231 also serves the purpose of a bearing for the bar 123, Fig. 6. By adjusting the set-screw 230 the rocking lever 228 is caused to advance or retire the plate 207, bearing the roller 208, the position of which roller determines the length of stroke of the tumbler. If 208 be pushed to the right, the stroke of the tumbler is shortened and the size of the mesh reduced. If it be drawn to the left, the tumbler-stroke is lengthened and the size of the mesh increased.

*Seventh. The tumblers and shuttle-carrier.*—The tumblers 132 have each a hook 133 to catch the weft-thread and a projecting arm provided with a weight 140. They have also a heel-piece 141, adapted to engage with a projection on the shuttle-carrier, as hereinafter explained.

The shuttle-carrier 137 slides in grooves 138 in the carrier-guide 139. The rack 240 runs lengthwise of the carrier-guide and engages with a carrier-wheel 241, which also engages with another gear-wheel 242, secured to the shuttle-carrier, for the purpose hereinafter described. The shuttle-carrier has lugs 243 and 244 provided at either end, to which a chain 245 is connected. The chain passes over jockey-pulleys 246 247 248, mounted in bearings secured to the shuttle-carrier guide. The chain 245 also passes around a sprocket-wheel 249, said sprocket-wheel being secured to a rod 150, one end of which is loosely held in the bearing 151, Fig. 2, the other end being allowed a slight lateral movement in a second bearing, Fig. 19. The rod 150 has secured to it at one end a small pinion-wheel 153, Figs. 17 and 18, engaging with the rack 154 on the wheel 155, keyed on the shaft 2. The slot in the bearing 152 is of such a width as to allow the pin 156, which projects beyond the teeth of the rack of the pinion-wheel 153, to move a distance equal to the width of the wheel 155. A trigger 158 is secured to the wheel 155 by a pin 159 and has two projecting ends 160 and 161, which bear against stops formed by the inclined sides of the plate 164. Said plate 164 projects beyond the periphery of the wheel 155 and occupies the same plane as that of the base of the teeth 154.

Assuming that the wheel 155 be rotated in the direction of the arrow 166, the pinion-wheel 153 will be rotated in the direction of the arrow 167 and will continue rotating until it passes the last tooth of the rack secured to the wheel 155. As soon as it passes said tooth the pinion-wheel 153 will cease to rotate and will strike against the point of the trigger 158, passing along one side of the trigger until it reaches the point 161, when it will then turn the trigger 158 into the position indicated by the dot-and-dash line 169. The pinion will then travel along the opposite side of the wheel 155. The wheel 155 will continue to rotate until the pinion-wheel engages again with the rack 154, but this time upon the other side of the wheel 155. The pinion 153, engaging with the rack 154, will then be driven in the opposite direction. By this means a to-and-fro motion is given to the shuttle-carrier 137.

The shuttle-carrier 137 has a plate 171 projecting in a sloping direction from it, said plate being provided with a bent rod 172 for the purpose of pressing back any of the tumblers which have not already been returned to their initial position by their respective counterweights 140. The rod 172 possesses means for partially rotating it by means of a screw 173, a block 174, and a projection 175. The said rod 172 is provided with bearings 176, secured to the plate 171. The plate 171 has also a guide-piece 177 attached thereto. The plate 171 is provided also with an extension-piece 178, with inclined ends 179 and 180. Secured to the plate 178 are two pins 181, working in two slots 182 in a second plate 183 for the purpose of operating the tumblers.

As the shuttle-carrier passes from left to right of the machine the inclined end 179 comes into play. The sliding bar 183 automatically moves backward, so as to prevent the tumblers from falling back until they have received the weft, and as the shuttle-carrier moves in the reverse direction the inclined end 180 is automatically uncovered, while the other end 179 is covered by the sliding bar 183, which also prevents the tumblers from coming forward too soon from their return movement.

*Eighth. The shuttle.*—The shuttle has two curved pointed ends 186 and its edges project, so as to enter the slots of the shuttle-guide 37. It has a rail 187, which rests upon the wheels 242 of the shuttle-carrier 137. The weft-thread from the spool 191 passes through the hole 199. At one end of the shuttle is the double spring device. (Shown in Fig. 14.) To the axle 193 is attached one end of a coiled spring 194, the other end of which is attached to a second coiled spring 195, which presses against the wall 196 of the spring-box 188.

*Ninth. The take-up mechanism*, (Figs. 1 and 3.)—The take-up roller 220 is mounted on a shaft 221, provided with bearings upon the main framing of the machine. An arm 222 rocks loosely on the shaft 221 and has attached to it a pawl 223, engaging with the teeth of the ratchet-wheel 224. The other end of the rocking arm has a connecting-rod 225 connected to a rocking lever 226, rocking upon bearings secured to the main frame of the machine. The inner end of the rocking lever has a bent piece rocked by a roller 232, secured to the cam 18, while the outer end of the rocking lever 226 is weighted to keep the requisite amount of tension upon the take-up roller. The pawl 233 is provided to prevent the backward movement of the take-up roller.

The action of the machine is as follows: Each warp-thread passes up through the hole 103 in the plate 109 and through the hole 106 in the bolt 107 around the bars 105, and thence up through the hole 8 in the guide 7. It then comes within the range of the operative organs of the machine and is woven into a mesh. After this the finished net is coiled on the take-up roller 220. Assuming the commencing position to be that shown in Figs. 1 and 2 and diagrams Figs. 24 and 24ª, the bar 10, with the guides 7, first shogs to the left, causing the thread to engage on the slip-hook 50. The guide-arm then advances, as indicated by dotted lines in Fig. 24ª, until it arrives beyond the left side of the fixed knotting-pin 74, Figs. 25 and 25ª. The bar 10 then shogs to the right, carrying the warp-thread around the knotting-pins 74 75, and returns to its original position at the right of and slightly above the slip-hook 50, Figs. 26 and 26ª. The depressor-bar 35 then descends, and the depressors 49 each take hold of the last fold of the respective warp-thread and shog to the left and thrust it down, forming a vertical loop of the part marked 336 between the parts 337 and 338, Figs. 27 and 27ª. Through the loop or shed thus formed the shuttle passes, traveling over the threads 336, while the shuttle-carrier, with its tumbler-actuating mechanism, travels underneath the said threads 336 in the carrier-guide 139. The weft-thread is thus drawn through the loops, as may clearly be seen by reference to Fig. 28ª, in which the mechanism is viewed from above, the loops on the left of the shuttle corresponding to Fig. 28, while those on the right correspond to Figs. 27 and 27ª. The tumblers 132 then come into play, being forced back by the plate 178 on the shuttle-carrier. The tumblers are brought forward by the action of their counterweights 140, and failing this by the bar 172. This movement causes them to engage and hold the weft-thread, Figs. 28, 28ª, and 29ª. The depressor-bar then rises again, shogs to the right, and the depressors resume their initial position, Fig. 29. The slip-hooks 50 then advance, and at the same time the tension-bar 102 falls, so as to take up the slack of the warp-thread and keep the same tight. As the hooks 50 advance they shog to the left, Fig. 29ª, when the arm 71 on the shaft 5 strikes against the roller 72, Fig. 1, allowing the slip-hooks 50 to clear the knotting-pins 74 75 and to pass slightly beyond them, releasing itself thereby from the loop. The small loop is now around the knotting-pin 75, which is immediately raised in the manner already described, causing it to release the loop, which now merely encircles the weft-thread left in it by the passage of the shuttle. The tumblers 132, moving to the left, draw tight the weft-threads, while the knots are tightened by pressure from the curved brushers 89. The mesh-governor plate 207 then rises, and the receiving-pins 205 move toward and over the tumblers 132. The plate 207 then descends, forcing the tumblers 132 to the right by the pressure of the roller 208 and causing them to cast off the weft-thread onto the pins 205. The receiver-drum 220 is revolved by the roller 232 striking against the arm 226, and thus operating the rocking arm 222, and with it the pawl 223, which engages in the ratchet-teeth on the wheel 224. After this the weighted rocking arm falls and the drum takes up the mesh formed.

What we claim is—

1. In apparatus for weaving rectangular-meshed netting with firm knots, a main shaft, a guide-arm shaft, means for oscillating said shaft, guide-arms on said shaft, a depressor-shaft, depressors on said shaft, means for reciprocating the said depressors, a slip-hook shaft, slip-hooks on said shaft adapted to temporarily hold the warp-threads during the formation of the loop, means for oscillating said slip-hook shaft, mesh-governor, knotting-pins, tumblers, means for oscillating said knotting-pins and tumblers, a tension device for the warp-threads, a double-ended shuttle, means for carrying and reciprocating said shuttle in combination with a plurality of warp-guides 7 on a movable bar 10 supported in bearings on the guide-arms aforesaid, said bar 10 bearing lugs 19, 20 adapted to engage alternately with levers 21, 22 on a rock-shaft 23 in operative connection with the main shaft.

2. In apparatus for weaving rectangular-meshed netting with firm knots, a main shaft, a guide-arm shaft, means for oscillating said shaft, guide-arms on said shaft, warp-guides in operative connection with said guide-arms, a depressor-shaft, depressors on said shaft, means for oscillating the said depressor-shaft, a slip-hook shaft, slip-hooks on said shaft adapted to temporarily hold the warp-threads during the formation of the loop, means for oscillating said slip-hook shaft, a mesh-governor, knotting-pins, tumblers, means for oscillating said knotting-pins and tumblers, a double-ended shuttle, means for carrying and reciprocating said shuttle, in combination with a pair of levers 102, the upright bars 104 mounted therein, the rods 105 connecting the bars 104, the plate 109 on levers 102, the movable warp-bolts 107 therein, and means for periodically lifting the said bolts.

3. In apparatus for weaving rectangular-meshed netting with firm knots, a motor-shaft, a guide-arm shaft, means for oscillating said shaft, guide-arms on said shaft, warp-guides in operative connection with said arms, a depressor-shaft, depressors on said shaft, means for oscillating the said shaft, a slip-hook shaft, slip-hooks on said shaft adapted to temporarily hold the warp-threads during the formation of the loop, means for oscillating said slip-hook shaft, tumblers, means for oscillating the said tumblers, a tension device for the warp-threads, a double-ended shuttle, means for carrying and reciprocating said shuttle, in combination with the plate 77 having a plurality of movable knotting-pins 75, and a plurality of fixed pins 79, a raising-plate 78 with slots to receive pins 79 adapted to lift the plate 77, lever mechanism attached to the said plate and in operative connection with the wheel 87, brushing-pins 89, an arm 92 in operative connection with the said brushing-pins, means for oscillating the said arm 92, receiving-pins 205 attached to a plate 206, a plate 207 adjustably supporting the plate 206, and means for raising and lowering the plate 207.

4. In apparatus for weaving rectangular-meshed netting with firm knots in combination with means for engaging, holding fast, releasing and maintaining tension upon the warp-threads and periodically forming loops therein, mechanism for catching the weft-thread, comprising the tumbler 132, said tumbler having a hook 133, and a projecting weighted arm 140 and heel-piece 141, adapted to engage with the shuttle-carrier 137, adapted to travel on the rack 240 by aid of wheels 241, 242 chains for reciprocating the shuttle, gearing adapted to operate the said chains, and means for reversing the direction of motion of the said shuttle-carrier.

5. In apparatus for weaving rectangular-meshed netting with firm knots, in combination with means for engaging, holding fast, releasing, and maintaining tension upon the warp-threads, and periodically forming loops therein, and tumblers for catching the weft-threads, means for carrying the weft-thread through the shed, comprising the shuttle-carrier 137, the rack 240, wheels 241, 242 attached to the shuttle-carrier and adapted to travel on said rack, chains for reciprocating the shuttle, sprocket-gearing adapted to operate the said chains, means for reversing the direction of motion of the said shuttle-carrier, a plate 171 projecting from the shuttle-carrier, a bent rod 172 on said plate, means for partially rotating the said bent rod adapted to insure the return of the tumblers, an extension-piece 178 with inclined ends 179 and 180 on said plate 171, pins 181 in slots 182 attached to a second plate 183 adapted to operate the tumblers.

In witness whereof we have hereunto set our hands in presence of two witnesses.

HENRY ARTHUR RENDALL.
WILLIAM GEORGE ACKERMAN.

Witnesses:
JOHN HODDER,
WILLIAM GEORGE HENNING.